US012710756B2

(12) United States Patent
Fröhlich et al.

(10) Patent No.: US 12,710,756 B2
(45) Date of Patent: Aug. 18, 2026

(54) SERVICE MODULE FOR WAREHOUSE TRAFFIC PLANNING ASSISTANCE

(71) Applicant: Dell Products L.P., Round Rock, TX (US)

(72) Inventors: Herberth Birck Fröhlich, Florianópolis (BR); Werner Spolidoro Freund, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 18/159,402

(22) Filed: Jan. 25, 2023

(65) Prior Publication Data

US 2024/0248473 A1 Jul. 25, 2024

(51) Int. Cl.
*G05D 1/00* (2024.01)
*G01C 21/00* (2006.01)

(52) U.S. Cl.
CPC ......... *G05D 1/0285* (2013.01); *G01C 21/383* (2020.08); *G05D 1/0274* (2013.01)

(58) Field of Classification Search
None
See application file for complete search history.

(56) References Cited

U.S. PATENT DOCUMENTS

2012/0323431 A1* 12/2012 Wong .................. G05D 1/0297 701/25
2015/0308839 A1* 10/2015 Jiang .................... G01C 21/383 702/5
2020/0173805 A1* 6/2020 Viswanathan ..... G01C 21/3641
2020/0393268 A1* 12/2020 Schroeter ............. G01C 21/387
2021/0168996 A1* 6/2021 Lee ...................... G05D 1/0278
2021/0215505 A1* 7/2021 Castorena Martinez .................... G01D 18/00
2021/0272316 A1* 9/2021 Yu ......................... G06T 7/0008
2022/0051175 A1* 2/2022 O'Herlihy ................ G06N 3/04
2022/0066456 A1* 3/2022 Ebrahimi Afrouzi ........................ G06F 3/04883
2022/0203973 A1* 6/2022 Dronen .................. G06V 20/58
2022/0214170 A1* 7/2022 Singh ................. G01C 21/3811
2022/0382286 A1* 12/2022 Martins .................. B25J 9/1666
2024/0210177 A1* 6/2024 Hong .................. G01C 21/206

FOREIGN PATENT DOCUMENTS

WO WO-2020132535 A1 * 6/2020 ........... B65G 1/0421

OTHER PUBLICATIONS

SafeWork (2019), "Forklift safety—reducing the risks", Australia.
(Continued)

*Primary Examiner* — Faris S Almatrahi
*Assistant Examiner* — Selena M Jin
(74) *Attorney, Agent, or Firm* — Workman Nydegger

(57) ABSTRACT

One example method includes receiving, by an integrating hub from each source in a group of sources, a signal and position information, so that multiple signals and respective position information for the signals is received, generating, by the integrating hub, a full risk map, and the full risk map is generated using the signals and their respective position information, and by the integrating hub, making the full risk map available to the sources, wherein the full risk map is usable by the sources to guide operations of the sources in an operating environment.

20 Claims, 6 Drawing Sheets

(56) References Cited

OTHER PUBLICATIONS

Sun, e. a. (2018), "Recurrent-OctoMap: Learning State-based Map Refinement for Long-Term Semantic Mapping with 3D-Lidar Data", IEEE Robotics and Automation Letters, 3(4), 3749-3756.
Ray Casting, Wikipedia, https://en.wikipedia.org/wiki/Ray_casting, Sep. 14, 2022.

* cited by examiner

SERVICE MODULE FOR WAREHOUSE TRAFFIC PLANNING ASSISTANCE

FIELD OF THE INVENTION

Embodiments of the present invention generally relate to movement of mobile entities within a physical environment. More particularly, at least some embodiments of the invention relate to systems, hardware, software, computer-readable media, and methods, for automatic generation of a traffic plan for mobile entities operating in a physical environment.

BACKGROUND

Warehouse consulting considers the question of traffic planning management, which is a set of rules for managing safe and efficient traffic operation in a workplace. This task goes differs from merely obtaining a navigation map, and may require addressing the potential risks of each area of the warehouse, or other physical operating environment where one or more vehicles are operating. Traffic planning should cover all vehicles and should be specific to each workplace environment. One core aspect of traffic planning is to identify and highlight warehouse locations where collision or any other potentially risky activity can occur, such as, for example, low visibility or excessive noise. In conventional approaches, this data may be collected by a roaming human. However, in dynamic environments, where many vehicles may be operating, human collection of data is impractical, and unsafe.

For example, the process of determining the risks of each map position, that is, each different position in an operating environment where a vehicle may be present at some point in time, is laborious, and collecting data for extensive physical areas can be a tedious and time-consuming task for a human. Moreover, data collection by a human is prone to error due to fatigue, a lack of attention, and the volume of data that needs to be collected. Such errors are problematic at least insofar as they can give rise to dangerous conditions in the operating environment, resulting from no, or inadequate, data collection about the environment and the movement of vehicles, and other environmental considerations such as noise, within the environment. While data collection may be streamlined to reduce the workload on a human collection of data, this approach to data collection can limit the observability to a single or few observations of each position in the environment. In any case, the observability cost increases with the size of the environment that is to be evaluated.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
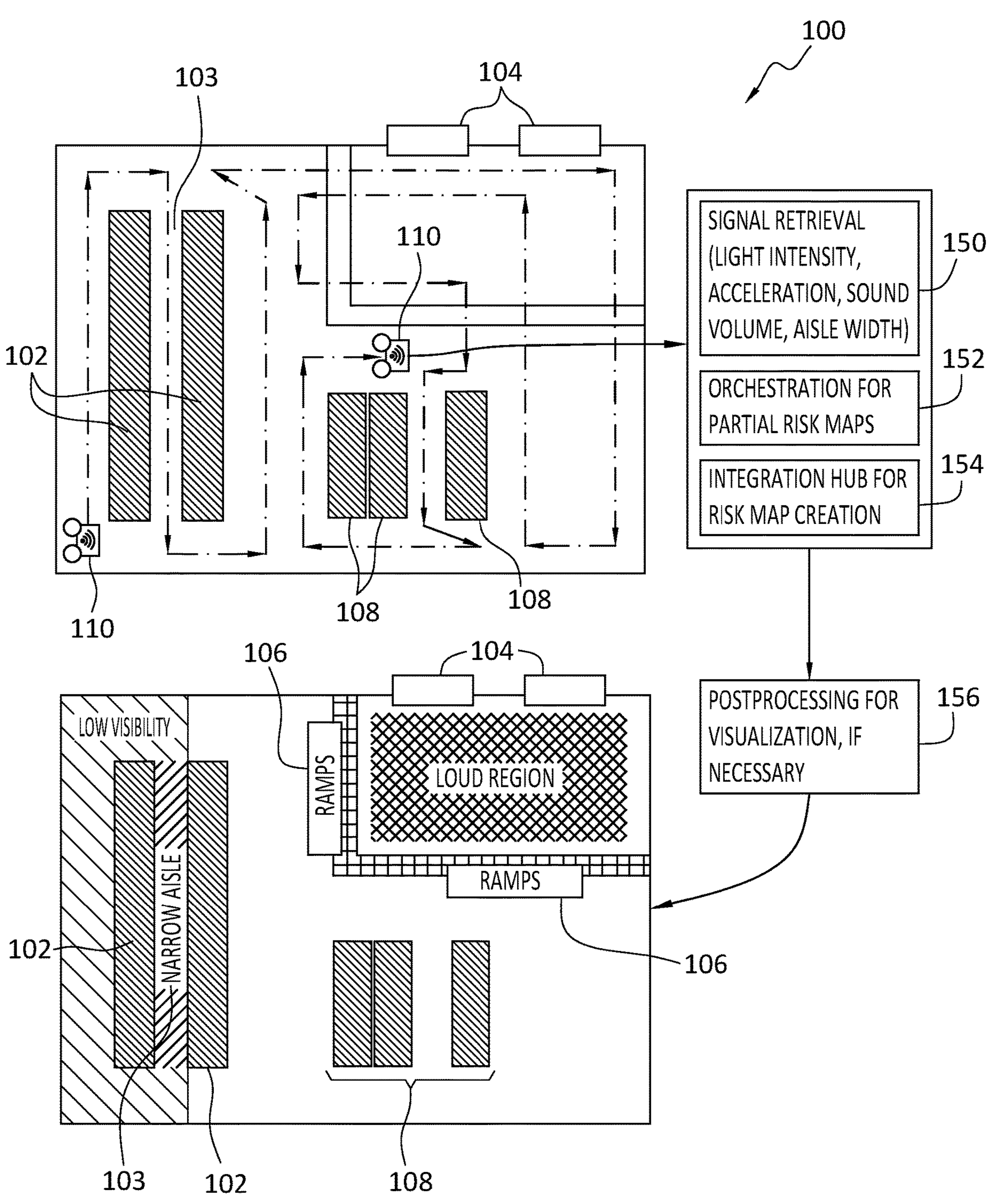
FIG. 1 discloses aspects of an example contextualization of an operating environment and simplified demonstration of an example embodiment.

Embodiments of the present invention generally relate to movement of mobile entities within a physical environment. More particularly, at least some embodiments of the invention relate to systems, hardware, software, computer-readable media, and methods, for automatic generation of a traffic plan for mobile entities operating in a physical environment.

In general, an example embodiment of the invention may be concerned with safety aspects of warehouse traffic of mobile entities, such as forklifts and Autonomous Mobile Robots (AMR). The potential tasks of an AMR may include, but are not limited to, transport, pickup, delivery, and placement, of goods. In an embodiment, an AMR may not require a human operator and can autonomously roam throughout an operating environment, and perform their tasks.

In more detail, an example embodiment may comprise a method that leverages the combination of several sensor signals, that is, signals received by sensors, and decision-making processes to automate traffic plan creation in terms of risk maps for use in operating environments, one example of which is a warehouse. For example, a module according to one embodiment may take guidance in consulting rules-of-thumb, for example, by considering as input features the presence, in a vehicle operating environment, of physical features such as, but not limited to, ramps/slopes, narrow aisles, regions with low light intensity, and regions with high sound volume intensity. In an embodiment, groups of one or more of such example input features may be used to generate, possibly automatically, risk maps that can be used by the vehicles and/or other entities to reduce the risk of accidents and other problems as one or more vehicles move throughout the operating environment.

Thus, an embodiment may comprise an orchestration method for traffic plan creation, such as in the form of one or more risk maps for example, where the orchestration method may ingest data from many signal sources at the edge and may employ embedded processing power, that is processing power in a vehicle for example, when adequate processing power is available. As well, an embodiment may comprise a method for increasing environment observability, that is, the observability of one or more environmental conditions, with more precise measurements, while reducing the cost when considering that AMRs are to operate in the environment.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may reduce, or eliminate, the need for, and attendant problems associated with, human collection of data concerning attributes of an operating environment in which various vehicles operate and/or may be operating. An embodiment may automatically generate risk maps so as to implicitly, and/or explicitly, define a traffic plan for vehicles operating in an environment. Various other advantages of some example embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

With particular attention now to FIG. 1, one example of an operating environment for embodiments of the invention is denoted generally at 100. In general, the operating environment 100 may comprise any physical environment in which one or more vehicles may operate. In an embodiment, the operating environment 100 may comprise a portion of a warehouse, although no particular operating environment 100 is required for any embodiment. The operating environment 100 may comprise various physical features. The physical features may be transitory or ephemeral physical features, such as noise, smoke, dust, and light, for example, or permanent physical features, such as ramps, stairs, and loading docks, for example.

In the example of FIG. 1, the operating environment 100 comprises a warehouse that includes shelves 102 separated by a relatively narrow aisle 103, loading docks 104, ramps 106, and areas 108 where the floor is uneven. In general, one or more AMRs 110 may use its autonomous capability to roam, randomly or non-randomly, through the operating environment 100. The AMRs 110 may each comprise one or more sensors that may each be configured to detect, and collect data concerning, one or more environmental features of the operating environment 100, as indicated at 150. The collected data may be transmitted by the AMRs 110 to an integrating hub for a decision-making processes and orchestration 152, and then a risk map may be created 154. Post-processing and visualization 156 of the risk map may be performed. In an embodiment, data from a variety of different sensors, which may be distributed among a group of AMRs, may be gathered and used for creation of a risk map. While gathering the data, the AMRs 110 mayor may not have routes, through the operating environment 100, that overlap with each other.

B. Sources and Signals

An embodiment of the invention may leverage one or more signals coming from microphones, range-based sensor, IMU (inertial measurement unit), accelerometers, photoresistors, photodetectors, and/or any other sensors that may be deployed aboard an AMR or other vehicle. Static sensors, that is, sensors residing in fixed locations in the operating environment may additionally, or alternatively, be used in an embodiment to gather data concerning environmental features. Note that sensors as disclosed herein may be referred to as generating a signal based on information and data detected and gathered by the sensor. For example, if a noise sensor detects a sound of a particular intensity or loudness, the noise sensor may generate a signal corresponding to the intensity or loudness of the detected sound, and that signal may be used in the creation of a risk map. In an embodiment of the invention, these signals may be stored together with their respective source position within the warehouse, that is, the position of the AMR or other vehicle that includes the sensor that generates the signal based on detection, by the sensor, of an environmental feature of an operating environment. An odometry approach may be used to collect and store the signals and their respective source position information.

Following is a non-exhaustive list of some sensors, and associated functionality, that may be employed in an embodiment of the invention:

1. microphone (mic): may detect high intensity sound volume areas—may be calculated with respect to the entire operating environment, such as a warehouse for example;
2. IMU/Accelerometers: may detect structural features, such as a ramp for example, using threshold-based models;
3. photoresistor: may detect lighting in environments that may be poorly lit—may be calculated in relation to the light intensity of the entire operating environment; and
4. range-based sensor (such as Lidar (light detecting and ranging), for example): may be used to determine dimensions of various physical features of the operating environment—for example, aisle widths, and other spaces.

As used herein, a 'source' may comprise, but is not limited to, an asset, such an AMR for example, that has one or more sensors installed, and can move, such as by roaming, throughout an operating environment such as a warehouse. A source may be able to map, and report on, its own location in relation to the operating environment. Note that for the purposes of risk map creation, it does not matter whether the signal comes from an autonomous source, such as an AMR, or from a guided source, so long as a source ID and route location is provided. Examples of some sources that may be employed by an embodiment of the invention include, but are not limited to:

1. one or more AMRs, when already available in an operating environment, may be particularly useful in an embodiment since some of the sensors, such as IMU and Lidar for example, may be implemented in off-the-shelf AMR solutions, so that gathering data may become simply a matter of retrieving the signals from the AMR. Moreover, and AMR may autonomously roam in the warehouse. Further, an embodiment may employ an already commissioned AMR, that is an AMR that is already performing another task, to embed sensors not already present in the operating environment by using a processing unit, such as an NVIDIA Jetson or a Raspberry PI for example. The processing algorithms may also be embedded or integrated using a near-edge unit rather than, or in addition to, a source such as an AMR.
2. a possibly less expensive option, in case AMRs are not available, may be a worker aboard a vehicle, that is, a worker operating a non-autonomous vehicle, if the positioning information of the vehicle is also being stored during acquisition using indoor GPS, for example. In an embodiment, signals from one or more sources may feed a service, and methods, possibly provided and implemented by the service, may be used to perform the appropriate computations based on the measurements to obtain environmental features of the operating environment, such as hazards, lighting, and dust. These features may then be matched to respective positions in the operating environment and used to create a risk map. Thus, an embodiment of the invention may, among other things, ingest, process, and orchestrate, both signal usage and risk map generation.

B.1 Sources and Routing Methods

An embodiment may compute the source position over time so that the source position may be associated with the sensor signals generated at that source. In an embodiment, this association may be implemented through the use of odometry methods, one example of which is the Lidar-odometry Iterative Closest Point (ICP) method.

One or more sensors may be employed in any given use case, but the choice of which sensors to use may be application specific. That is, the combination of sensors to be employed in a given use case may depend on the operating environment and/or the availability of resources, for generating signals, in that operating environment. For example, sound and light, as risk factors, may not be of interest in some cases.

There are various approaches to the use of sources and signal acquisition. For example, an embodiment may involve AMRs and/or other vehicles moving over the same routes with the same types of sensors. This approach may result in overlapping of one or more signals of the same type. An emphasis in this example use case may be on repeatability and generalization. This mode may be useful when, for example, seasonality in events, such as warehouse events for example, is to be considered.

Another embodiment may involve AMRs and/or other vehicles moving, independently of each other, over various routes in the operating environment, with no overlapping of the same signal types. This example use case may emphasize mapping speed. In the case of independent routes, the sources may be complementary, that is, different sources may be responsible for capturing information from different locations in the environment. This type of parallelism may result in faster risk map construction.

B.2 Partial Risk Map Creation: Relative Rules and Threshold-Based Methods

In an embodiment, a 2D risk map may suffice for some applications, when consideration is given to ground-based mobile assets such as AMRs for example, as may be typical in environments such as warehouses. To reduce computational requirements, an embodiment may operate to simplify the 2D map representation using quadrants.

Thus, an initial step in one embodiment may be to establish quadrant granularity. In general, the number of quadrants may define how detailed the final risk map will be, insofar as some of the same signals inside the quadrants may be averaged to facilitate the calculation of overlaps. With attention now to FIG. 2, there are disclosed two representations, 200*a* and 200*b*, each with a different respective granularity for the same environment, a warehouse in this example. In this example, the representation 200*a* of the warehouse comprises 25 quadrants, while the representation 200*b* of the warehouse is less granular than the representation 200*a*, comprising only 9 quadrants. Quadrant 18 of the left-hand image, for example, gathers the signals that are generated by the source(s) located between the dimensions X2 and X3, and between Y3 and Y4, of the warehouse.

In an embodiment, each signal generated by a source may be associated with its own respective method to process the information, that is, the signal. In an embodiment, the methods may comprise various types of rules. In a method that employs relative rules, signal observations for a portion of the warehouse, such as a quadrant for example, may be compared to the same signals from the entire warehouse. In a method that employs threshold-based rules, a user may input a threshold so the method can decide if there is a risk, or not, at a certain quadrant. The following discussion addresses some example methods for various sensor types.

B.2.1 Threshold-Based Rules

One type of threshold-based sensor that may be employed in an embodiment is a range-based sensor. In general, a range-based sensor may operate to measure a distance and then generate a signal corresponding to the magnitude of the distance which may be measured in two dimensions (such as in an X-Y plane) or in three dimensions (such as in an X-Y-Z coordinate system).

B.2.1.1 Range-Based Sensors

As noted earlier herein, one example of a range-based sensor is an active remote sensing system such as LiDAR (Light Detection and Ranging). Such a sensor may operate to generate a point cloud that may be used, for example, to obtain the width of an aisle. That is, the point cloud, which comprises a three dimensional (3D) output of such a sensor, may comprise an XYZ component within the operating environment, as well as GPS (global positioning system) positioning in the larger context of the earth, but not all this information is required.

In an embodiment, such a point cloud may be simplified using OctoMap, a reliable and memory-efficient 3D dense map model that may yield a hierarchical discrete representation of a space in voxels, also referred to as space cubes or volume pixels, where there is a probability of the space to be occupied. Further information concerning OctoMap and its operation and applications is disclosed in Sun, e. a. (2018). *Recurrent-OctoMap: learning state-based map refinement for long-term semantic mapping with 3-d-Lidar data. IEEE Robotics and Automation Letters,* 3(4), 3749-3756 ("Sun 2018"), which is incorporated herein in its entirety by this reference. In an embodiment, aisle width may be determines using a greedy method that copes with asset misalignment, as discussed below in connection with FIGS. 3*a* and 3*b*.

Figure 3A:
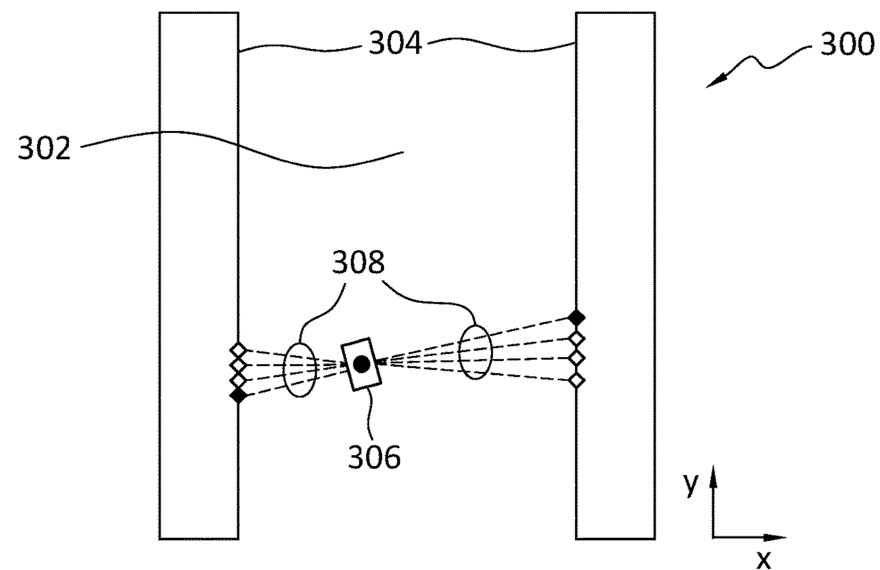
FIG. 3*a* discloses an example of partial risk map acquisition from 4 sources, in an X-Y plane.
Figures 3B, 4:
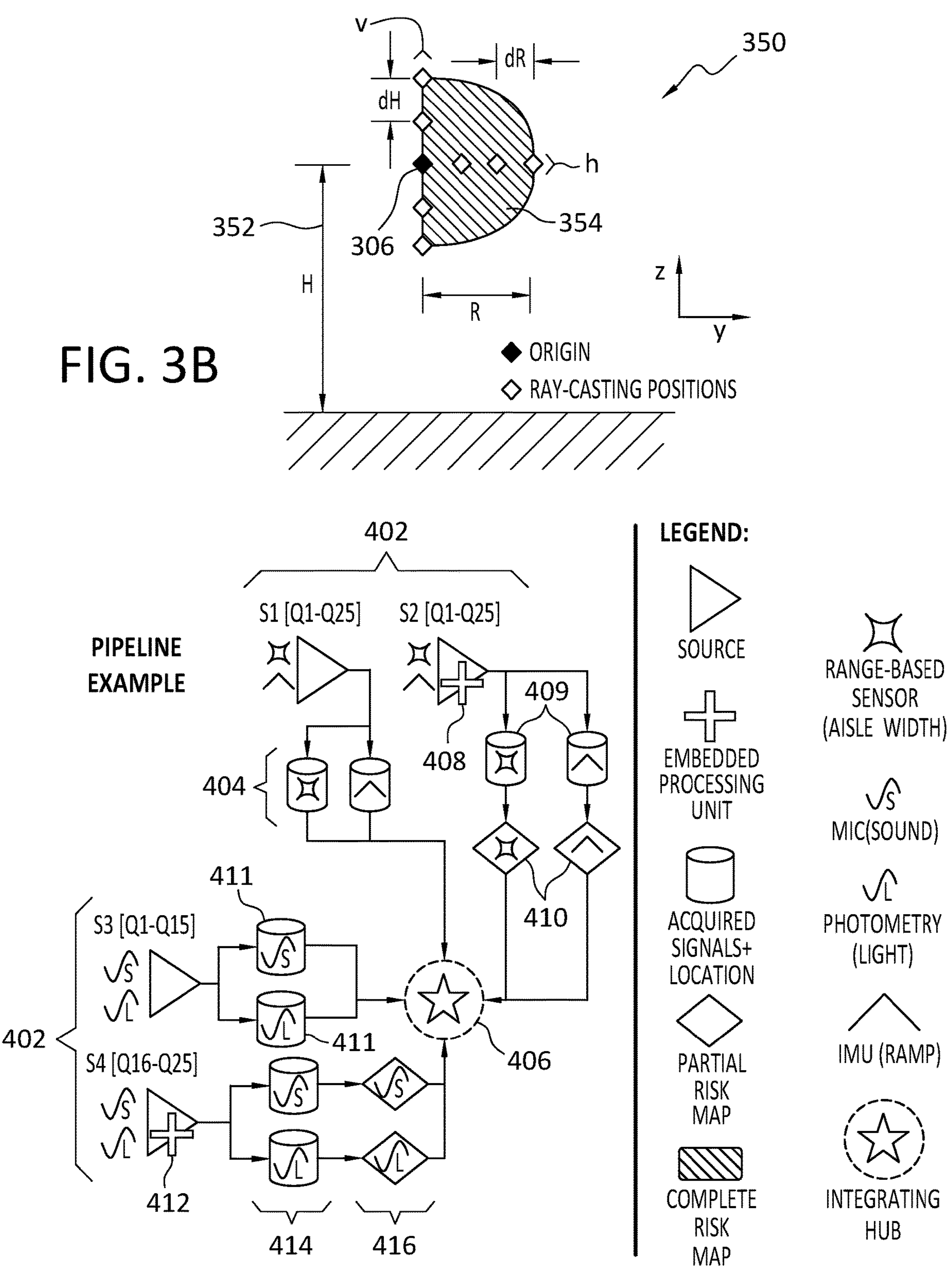
FIG. 3*b* discloses an example of partial risk map acquisition from 4 sources, in a Y-Z plane.
FIG. 4 discloses an example integrating hub receiving signal dictionaries and partial risk maps for complete risk map development.

In general, FIGS. 3*a* and 3*b* disclose an illustration of an example aisle width computation algorithm based on ray-casting operations. In this example, the search area checked by the range-based sensor is ahead for the closest side, and behind the original ray-cast for the distance measurement. As used herein, ray-casting may be the same as, or similar to, " . . . ray tracing for computer graphics where virtual light rays are 'cast' or 'traced' on their pathfrom the focal point of a camera, or other sensor such as a range-based sensor, through each pixel in the camera sensor to determine what is visible along the ray in the 3D scene." See, e.g., https://en.wikipedia.org/wiki/Ray_casting.

More particularly, FIG. 3*a* comprises a top-view representation 300 of an aisle 302 defined by structures 304, such as walls or shelves for example. In this example, a sensor 306 may move along the aisle 302 and perform a horizontal sweep 308 to each structure 304 to gather data for determining a width of the aisle 302. The position of the sensor 306, as shown in FIG. 3*a*, may be expressed in terms of X and Y coordinates.

Turning next to the side view representation 350 disclosed in FIG. 3*b*, a height H 352 of the sensor 306, a LIDAR sensor in this example, above a reference surface, such as the floor of a warehouse, is disclosed. In FIG. 3*b*, an example search area 354 of the sensor 306 is disclosed that has a half-circle configuration.

With continued reference to FIG. 3*b*, a method according to one embodiment may receive, and employ, various parameters and information from a range-based sensor. Such parameters may include, for example:

H: LiDAR height above a reference surface, such as a warehouse floor for example;

#v: number of vertical points minus one to ensure symmetry—four are shown in the example of FIG. 3*b;*

#h: number of horizontal points minus one—three are shown in the example of FIG. 3*b;* dH: distance (Z-direction) between adjacent vertical points 'v'; and dR: distance (Y-direction) between adjacent horizontal points 'h'.

Using this information, a method according to one embodiment may proceed as follows:

1. import parameters H, dH, R, dR, number of horizontal points, number of vertical points, and threshold;
2. transform the point cloud from LiDAR into an OCTO-MAP;
3. ray-cast laterally for both sides having the Origin point as target and sweep vertically (H-axis, also referred to as the Z-axis) for non-empty spaces;
4. ray-cast laterally for both sides having the Origin as target and sweep horizontally (R-axis, also referred to as the Y-axis)—keeping the closest points from each side;
5. compute the Euclidean distance projected in the x-y plane for aisle local width; and
6. apply a threshold, yielding a Boolean flag for that position, a YES or NO for narrowness.

B.2.1.2 Ramps and Other Features

In an embodiment, an onboard IMU/accelerometer, such as may be embedded in equipment such as an AMR, may have its output signal altered in the presence of physical features, such as ramps for example, of an operating environment. In the illustrative case of a ramp, the steepness of the ramp may impact positively, or negatively, on the risk of the area where the ramp is located. Thus, a user may define and enter a threshold that dictates whether or not the slope or ramp should be inserted in the map. For example, a steep ramp, which may pose a significant hazard, may be included in the map, while a relatively slightly sloped ramp may pose little hazard and, accordingly, may be omitted from the map.

In this example, the computation of the potential risk posed by a ramp may be performed using a control chart that may check the average of the occurrences of gravitational force. For the use of the control chart, an embodiment may specify a correction window, and n analysis window, as follows:

- the correction window defines the period that is to be used to compute the mean and standard deviation a; and
- the analysis window is the period in which the method may analyze whether the signal exceeds 3 standard deviations, plus or minus (upper and lower limits, respectively).

In this illustrative example, the ramp may be marked on the risk map at the point of the rule break. Using ±3 a is one possible rule for the control chart method, although other rules may be defined by the user.

B.2.2 Relative Rules

In an embodiment, relative rules may be applied for sound volume, and light intensity, respectively. For example, one or more sources may operate to map all sound and/or audio data of a route of a vehicle through an operating environment such as a warehouse. A partial risk map may then be constructed for each source, with the average value of the data, or signal, for each quadrant for a source being taken as the value associated with each quadrant through which the route passes. A new intensity average, for example, may then be calculated by overlapping all of the partial risk maps. The overall average of the data may be calculated from the complete sound/light intensity map, and in each quadrant, the result may be analyzed in relation to the average of the entire risk map. On the full risk map, these differences may be noted in percentage terms, that is, a quadrant value as a percentage of the overall intensity average.

B.3 Risk Map Orchestration and Creation

In an embodiment, a goal may be generation of a complete risk map which integrates all the information from the various sources. In this embodiment, each source may generate one partial risk map for each signal type that was collected by that source. These partial maps may be aggregated, by the source or at a central location in communication with the source, to create a complete risk map for a given source. More particularly, these maps, both partial and complete, may be generated at the edge, that is, at the sources themselves if the embedded preprocessing allows it, or at the near edge in a processing center. There may also be a customization, where partial risk maps are generated at the edge and aggregated together with the maps generated by one or more other the near-edge nodes. This aggregation may be performed, for example, at a near-edge processing center in communication with the sources, and the near-edge processing center may comprise an integrating hub, an example of which is disclosed in FIGS. 4 and 5, discussed below.

A method according to one embodiment may comprise the following operations:

1. each source collects the signals generated by the onboard sensors in a certain region of the warehouse;
2. each source stores a dictionary per embedded signal type, the dictionary containing the source ID, the acquired signals, and the relative respective acquisition positions of the signals;
3. if the source has on-board processing, a partial map module at the source may be used to apply the methods to each of these dictionaries to generate the partial map for that source—note that the respective partial maps for each sensor type may be different:
   a. partial sound/light map: may comprise an average sound and/or light value associated with each quadrant;
   b. partial map of ramp: may comprise binary tags (YES/NO) for the existence of a ramp in each quadrant; and
   c. partial map of aisle width: may comprise binary tags (YES/NO) for the existence of narrow corridors in that quadrant;

(thus, a partial map may comprise a dictionary containing an ID with the type of signal, the quadrant(s) for which the signal was generated, and the decision, which may be a binary YES/NO, concerning each signal); and 4. the integration hub may then receive the signal dictionaries or partial maps, and the integration hub may then perform the following operations:
   4a. creating the remaining partial maps from the signal dictionaries using the partial map module;
   4b. integrating the signals—during integration, each signal type dictionary may be merged, and when there is overlapping, majority voting may be performed for binary signals (for example, ramps, aisle width), or averaging may be used in the case of continuous signals (for example, sound, light); and
   4c. generating the complete risk map—the partial maps may be aggregated into a single frame containing the quadrant number and a column for each signal type, with the result, that is, the existence or not of a feature such as a narrow corridor in each quadrant, the existence or not of a ramp in each quadrant and, finally, the percentage above or below the average sound/light intensity in each quadrant.

Figures 5, 6:
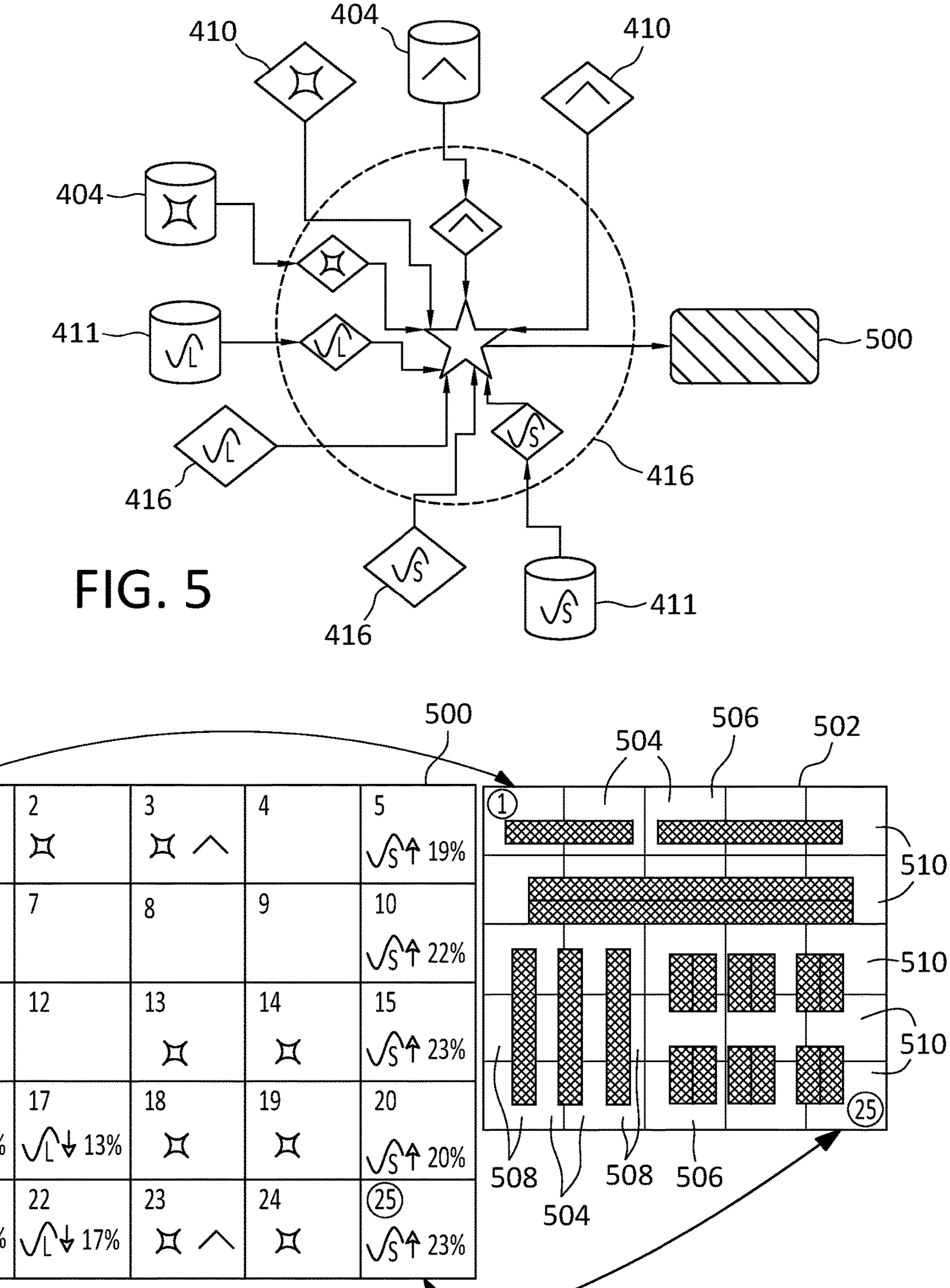
FIG. 5 discloses an example integrating hub and inputs.
FIG. 6 discloses an example of a complete risk map diagram.

With reference now to FIGS. 4 and 5, an example of partial risk map creation is shown. FIG. 4 discloses an example of partial risk map acquisition from 4 sources, and FIG. 5 discloses an example integrating hub receiving signal dictionaries and partial risk maps for complete risk map generation.

Figure 2:
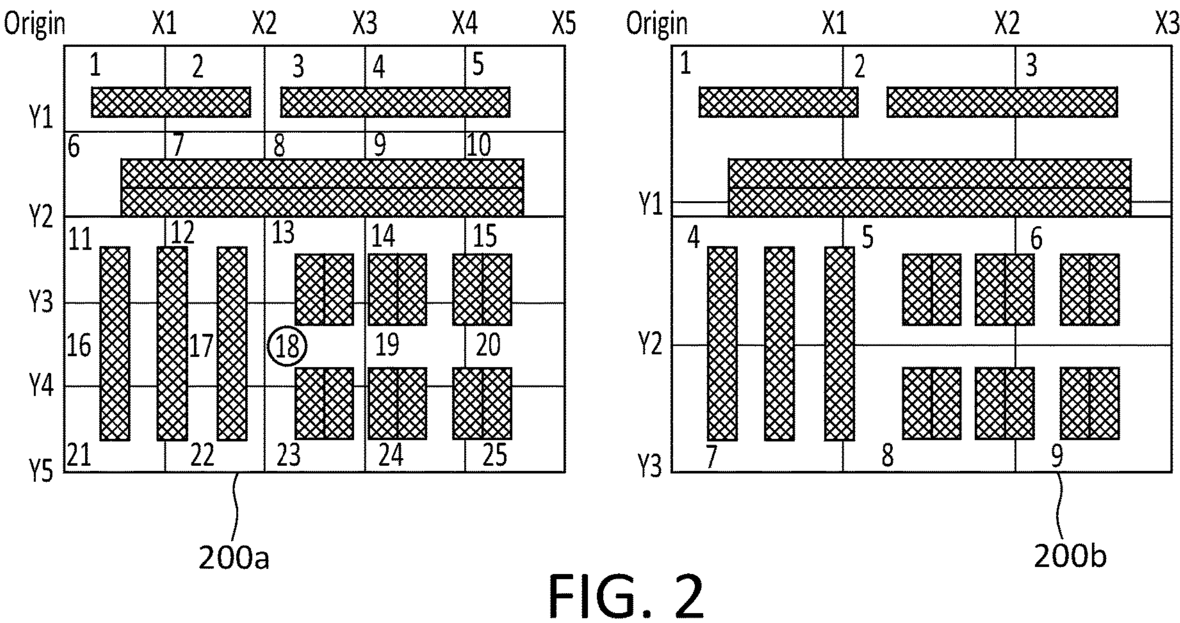
FIG. 2 discloses aspects of a configuration including two levels of complexity for quadrant splitting.

In more detail, FIG. 3 and FIG. 4 present an example of risk map creation using 4 sources 402, S1-S4, applied to the hypothetical warehouse shown in FIG. 2 (using 25 quadrants). As shown in FIG. 4, Sources 1 (S1) and 2 (S2) have their routes overlapped, that is, both S1 and S2 pass through all quadrants, Q1-Q25, of the warehouse. As also shown in FIG. 4, the sources S1 and S2 are each configured to acquire both range-based sensor information, and IMU signals. In this example, source S1 sends signals dictionaries 404 to the integrating hub 406. On the other hand, source S2, in this example, has an embedded processing unit 408, and as such is able to generate, using dictionaries 409, the partial risk maps 410 at the edge, that is, at the source S2.

With continued reference to the example of FIG. 3, it can be seen that the sources S3 and S4 are complementary in terms of the quadrants in which they collect data and in formation. That is, source S3 collects data from quadrants Q1-Q15, while S4 collects data from quadrants Q16-Q25. In this illustrative example, sources S3 and S4 both collect audio and light intensity signals. More generally however, a source may collect any grouping of one or more different ty types of signals and, as such, the embodiments disclosed in FIGS. 4 and 5 are presented only by way of example. As further disclosed in FIG. 4, source S3 sends the signals and location data, possibly in the form of one or more dictionaries 411, directly to the integrating hub 406 since source S3 does not have embedded processing, as in the case of source S4, which includes an embedded processing unit 412. Particularly, source S4 may employ the embedded processing unit 412 to create respective partial risk maps 416 using dictionaries 414, and the partial risk maps 416 may then be transmitted to the integrating hub 406.

The integrating hub 406 may then create a complete risk map 500. As shown in FIGS. 4 and 5, and discussed earlier, the complete risk map 500 may be created using one or more partial risk maps created by the sources, and using one or more partial risk maps created by the integrating hub 406. With reference now to FIG. 6, further details are provided concerning the example risk map 500, which may correspond to a physical layout 502 of the environment from which the risk map 500 was developed. As shown, each of the quadrants in the physical layout 502 corresponds to a respective quadrant of the risk map 500. As shown in FIG. 6, there are some narrow aisles 504 at some quadrants because of shelves arrangement, two ramps 506 because of an uneven floor, a low light intensity 508 in the left bottom quadrants 16, 17, 21 and 22, and a high-volume sound or noise intensity 510 at the right side, possibly due to the presence of a loading dock, for example.

In an embodiment, the risk map 500 may be pushed to, or pulled by, the sources S1 to S4, from the integrating hub 406. The sources S1 to S4 may then use the risk map 500 to control the operation, in the operating environment, of the respective vehicles, which may comprise AMRs, with which the sources S1 to S4 are associated. The risk map 500 may be updated in various ways. In an embodiment, data gathered by the sources may be uploaded to the integrating hub 406 when a new/modified feature is encountered in the operating environment by the sources, and/or when a new/modified feature is included within the operating environment, the integrating hub 406 may update the risk map 500 and make the risk map 500 available to the sources. Likewise, when a feature, such as a ramp for example, is removed from the operating environment, the risk map 500 may be updated by the source(s) and/or by the integrating hub 406.

C. Example Methods

Figure 7:
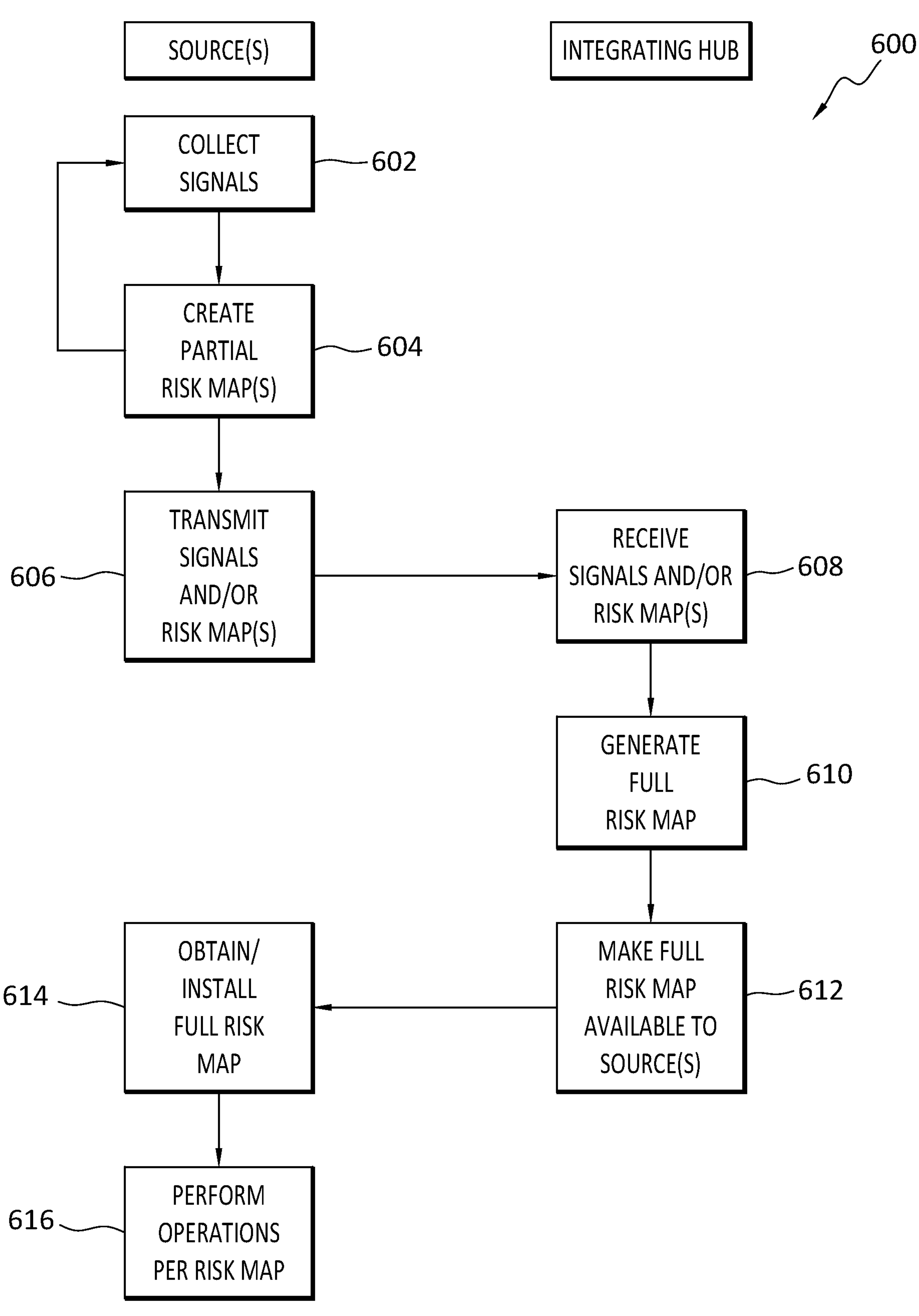
FIG. 7 discloses a method according to one example embodiment.

It is noted with respect to the disclosed methods, including the example method of FIG. 7, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 7, a method according to one example embodiment is generally denoted at 600. In an embodiment, the method 600 may be cooperatively performed by one or more vehicles, and an integrating hub with which the vehicles are able to communicate. No particular functional allocation is required by any embodiment however.

The example method 600 may begin when one or more sources move through an operating environment and collect signals 602 generated by sensors in response to the sensing of one or more features of the operating environment. The collection of the signals 602 may comprise collection of position information concerning the location of the source(s) at the time the signals were collected. In some instances, one or more of the sources may use the signals, and position information concerning the signals, to create 604 respective partial risk maps, when those sources have adequate computing power, such as processors, storage, and memory, to do so.

When a source has adequate computing resources to generate a partial risk map, the partial risk map may be transmitted 606 to an integrating hub. When a source does not have adequate computing resources to generate a partial risk map, the source may simply transmit 606 the signals, and position information, possibly in the form of a dictionary, to the integrating hub. Thus, the integrating hub may receive 608 a combination comprising both partial risk maps and 'raw' data, where the raw data may comprise a combination of signals and their respective position information.

The integrating hub may use any partial risk maps and/or raw data to generate a full risk map 610 for the operating environment. The full risk map may then be made available 612 to the source(s) by the integrating hub. The source(s) may then obtain and install 614 the full risk map. The installed risk map may then be used by the source(s) to guide operations 616 of the source(s) in the operating environment.

Note that the collection of signals 602 may be ongoing, or performed at intervals, in order that one or more partial risk maps may be updated, such as at 604, to reflect changes in the operating environment, such as, for example, the addition, removal, and/or modification of features of the operating environment. Any or all of the various operations disclosed in FIG. 7, including 602 and 604, may be performed automatically without requiring instantiation, or involvement, by a human.

D. Further Example Embodiments

Following are some further example embodiments of the invention. These are presented only by way of example and are not intended to limit the scope of the invention in any way.

Embodiment 1. A method, comprising: receiving, by an integrating hub from each source in a group of sources, a signal and position information, so that multiple signals and respective position information for the signals is received; generating, by the integrating hub, a full risk map, and the full risk map is generated using the signals and their respective position information; and by the integrating hub, making the full risk map available to the sources, wherein the full risk map is usable by the sources to guide operations of the sources in an operating environment.

Embodiment 2. The method as recited in any of the preceding embodiments, wherein each of the signals was generated by a respective sensor, and the position information for each of the signals indicates where, in the operating environment, the corresponding source was located when the signal was generated.

Embodiment 3. The method as recited in any of the preceding embodiments, wherein each of the signals was generated based on the presence of a corresponding feature of the operating environment.

Embodiment 4. The method as recited in any of the preceding embodiments, wherein each of the signals was generated based on either a transitory physical feature of the operating environment, or a permanent physical feature of the operating environment.

Embodiment 5. The method as recited in any of the preceding embodiments, wherein one of the sources comprises an autonomous mobile robot.

Embodiment 6. The method as recited in any of the preceding embodiments, wherein the signal and the position information received by the integrating hub from one of the sources is received by the integrating hub in a form of a partial risk map.

Embodiment 7. The method as recited in any of the preceding embodiments, wherein the signal and the position information received by the integrating hub from one of the sources is received by the integrating hub in a form of a dictionary.

Embodiment 8. The method as recited in any of the preceding embodiments, wherein the full risk map is generated by the integrating hub using a partial risk map generated by the integrating hub.

Embodiment 9. The method as recited in any of the preceding embodiments, wherein one of the signals was generated by a range-based sensor.

Embodiment 10. The method as recited in any of the preceding embodiments, wherein the full risk map is a two dimensional map.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
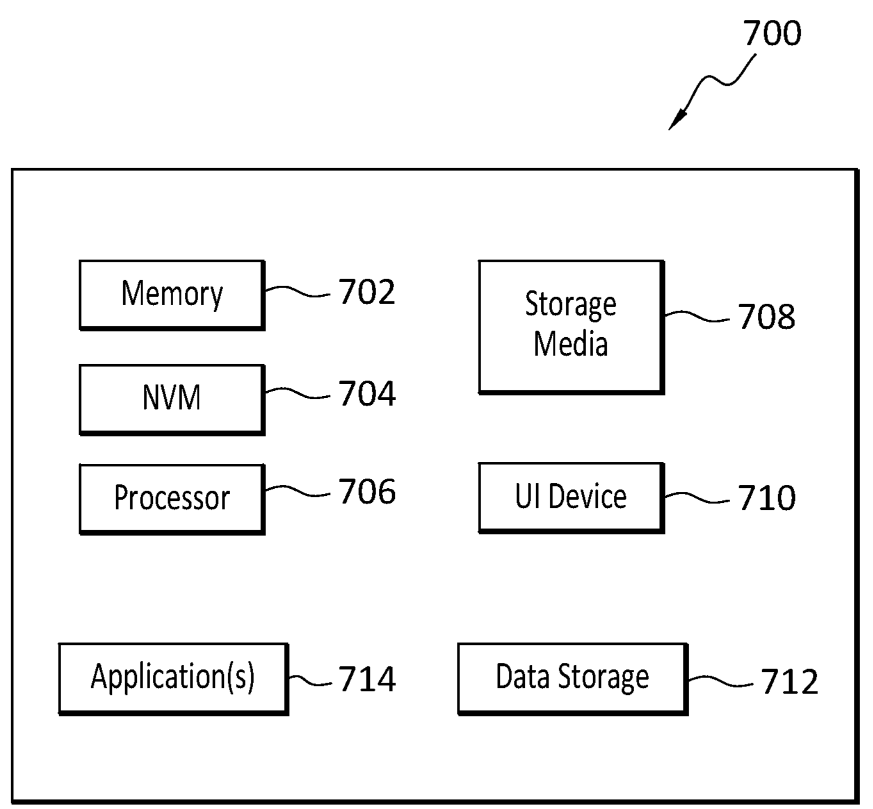
FIG. 8 discloses an example computing entity configured, and operable, to perform any of the disclosed methods, processes, and operations.

With reference briefly now to FIG. 8, any one or more of the entities disclosed, or implied, by FIGS. 1-7, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 8.

In the example of FIG. 8, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving, by an integrating hub and from each source in a group of sources, a corresponding signal and corresponding position information, so that multiple signals and respective position information for the signals are received, wherein at least some of the multiple signals and position information are received in a form of a light detection and ranging (LiDAR) point cloud;

transforming the LiDAR point cloud into a three-dimensional (3D) map model that yields a hierarchical discrete representation of a space using voxels, wherein said transforming includes:

generating, from LiDAR data points obtained from the LiDAR point cloud, an octomap;

determining an aisle width within the space by performing ray-casting laterally from an origin point on the octomap and sweeping vertically and horizontally to compute a Euclidean distance projected in an x-y plane; and classifying the aisle width using a threshold to produce a boolean narrowness flag for the position;

generating, by the integrating hub, a full risk map, wherein the full risk map is generated using the signals and their respective position information and is generated using the 3D map model, which represents the space using the voxels, wherein the boolean narrowness flag is incorporated into the full risk map as a binary indication for a quadrant position, wherein the full risk map is also generated by (i) identifying two signals that are of a same type and that share common position information and (ii) averaging the two signals to create an average signal, and wherein the average signal is used in the full risk map and is used to represent signal information for the common position information; and making, by the integrating hub, the full risk map available to the sources, wherein the sources use the full risk map to guide operations in an operating environment, which includes said space.

2. The method as recited in claim 1, wherein each of the signals was generated by a respective sensor, and the position information for each of the signals indicates where, in the operating environment, the corresponding source was located when the signal was generated.

3. The method as recited in claim 1, wherein each of the signals was generated based on the presence of a corresponding feature of the operating environment.

4. The method as recited in claim 1, wherein each of the signals was generated based on either a transitory physical feature of the operating environment, or a permanent physical feature of the operating environment.

5. The method as recited in claim 1, wherein one of the sources comprises an autonomous mobile robot, or a non-autonomous vehicle, with sensors and position information acquisition capability.

6. The method as recited in claim 1, wherein the signal and the position information received by the integrating hub from one of the sources is received by the integrating hub in a form of a partial risk map.

7. The method as recited in claim 1, wherein the signal and the position information received by the integrating hub from one of the sources is received by the integrating hub in a form of a dictionary.

8. The method as recited in claim 1, wherein the full risk map is generated by the integrating hub using a partial risk map generated by the integrating hub.

9. The method as recited in claim 1, wherein one of the signals was generated by a range-based sensor.

10. The method as recited in claim 1, wherein the full risk map is a two dimensional map.

11. A non-transitory storage medium having stored therein instructions that are executable by one or more hardware processors to perform operations comprising:

receiving, by an integrating hub and from each source in a group of sources, a corresponding signal and corresponding position information, so that multiple signals and respective position information for the signals are received, wherein at least some of the multiple signals and position information are received in a form of a light detection and ranging (LiDAR) point cloud;

transforming the LiDAR point cloud into a three-dimensional (3D) map model that yields a hierarchical discrete representation of a space using voxels, wherein said transforming includes:

generating, from LiDAR data points obtained from the LiDAR point cloud, an octomap;

determining an aisle width within the space by performing ray-casting laterally from an origin point on the octomap and sweeping vertically and horizontally to compute a Euclidean distance projected in an x-y plane; and classifying the aisle width using a threshold to produce a boolean narrowness flag for the position;

generating, by the integrating hub, a full risk map, wherein the full risk map is generated using the signals and their respective position information and is generated using the 3D map model, which represents the space using the voxels, wherein the boolean narrowness flag is incorporated into the full risk map as a binary indication for a quadrant position, wherein the full risk map is also generated by (i) identifying two signals that are of a same type and that share common position information and (ii) averaging the two signals to create an average signal, and wherein the average signal is used in the full risk map and is used to represent signal information for the common position information; and making, by the integrating hub, the full risk map available to the sources, wherein the sources use the full risk map to guide operations in an operating environment, which includes said space.

12. The non-transitory storage medium as recited in claim 11, wherein each of the signals was generated by a respective sensor, and the position information for each of the signals indicates where, in the operating environment, the corresponding source was located when the signal was generated.

13. The non-transitory storage medium as recited in claim 11, wherein each of the signals was generated based on the presence of a corresponding feature of the operating environment.

14. The non-transitory storage medium as recited in claim 11, wherein each of the signals was generated based on either a transitory physical feature of the operating environment, or a permanent physical feature of the operating environment.

15. The non-transitory storage medium as recited in claim 11, wherein one of the sources comprises an autonomous mobile robot, or a non-autonomous vehicle, with sensors and position information acquisition capability.

16. The non-transitory storage medium as recited in claim 11, wherein the signal and the position information received by the integrating hub from one of the sources is received by the integrating hub in a form of a partial risk map.

17. The non-transitory storage medium as recited in claim 11, wherein the signal and the position information received by the integrating hub from one of the sources is received by the integrating hub in a form of a dictionary.

18. The non-transitory storage medium as recited in claim 11, wherein the full risk map is generated by the integrating hub using a partial risk map generated by the integrating hub.

19. The non-transitory storage medium as recited in claim 11, wherein one of the signals was generated by a range-based sensor.

20. The method of claim 1, wherein a subset of the multiple signals and position information represents a sloped region of the operating environment, and wherein the method further includes:

defining a slope threshold that dictates whether a given slope of a given sloped region is classified as a hazard;

applying the slope threshold to the sloped region of the operating environment; and modifying the full risk map by inserting the sloped region of the operating environment into the full risk map.

* * * * *